(12) United States Patent
Shimizu et al.

(10) Patent No.: US 7,892,679 B2
(45) Date of Patent: Feb. 22, 2011

(54) NON-AQUEOUS ELECTROLYTE SECONDARY BATTERY

(75) Inventors: Noriyuki Shimizu, Kobe (JP); Hideki Kitao, Kobe (JP); Kouichi Sato, Itami (JP); Yoshinori Kida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1091 days.

(21) Appl. No.: 11/645,685

(22) Filed: Dec. 27, 2006

(65) Prior Publication Data

US 2007/0148546 A1 Jun. 28, 2007

(30) Foreign Application Priority Data

Dec. 28, 2005 (JP) .............................. 2005-378829
Dec. 7, 2006 (JP) .............................. 2006-330459

(51) Int. Cl.
*H01M 4/00* (2006.01)
*H01M 4/50* (2006.01)
*H01M 4/58* (2006.01)

(52) U.S. Cl. .................... 429/223; 429/224; 429/231.1

(58) Field of Classification Search .................. 429/223, 429/224, 231.1
See application file for complete search history.

(56) References Cited

U.S. PATENT DOCUMENTS

2003/0108793 A1 6/2003 Dahn et al. .................. 429/224

FOREIGN PATENT DOCUMENTS

JP 2002-100358 * 4/2002

* cited by examiner

*Primary Examiner*—Patrick Ryan
*Assistant Examiner*—Muhammad Siddiquee
(74) *Attorney, Agent, or Firm*—Kubovcik & Kubovcik

(57) ABSTRACT

The non-aqueous electrolyte secondary battery of the present invention uses, as the positive electrode active material, a mixture of a lithium-containing transition metal oxide $Li_aNi_xMn_yO_2$ (wherein a, x, and y respectively satisfy the following relations: $1<a\leq1.5$; $0.5\leq x+y\leq1$; $0<x<1$; and $0<y<1$) containing nickel and manganese as transition metals and having the layered rock-salt type crystal structure of a hexagonal system belonging to space group R-3m and a lithium manganese oxide $Li_{(1+b)}Mn_{(2-b)}O_4$ (wherein b satisfies $0\leq b\leq 0.33$) having the spinel structure.

3 Claims, 2 Drawing Sheets

NON-AQUEOUS ELECTROLYTE SECONDARY BATTERY

BACKGROUND OF THE INVENTION

1. Field of the Invention

The present invention relates to a non-aqueous electrolyte secondary battery using, as a positive electrode active material, a lithium-containing transition metal oxide containing nickel and manganese as transition metals.

2. Description of the Related Art

In recent years, to solve environmental issues of exhaust gases, HEV (Hybrid Electric Vehicle) employing an automotive gasoline engine and an electric motor in combination has been internationally developed. As an electric power source for HEV, conventionally nickel-hydrogen secondary batteries have been employed, however it is highly desired to develop Specifically usable lithium ion secondary batteries with high voltage and high capacity.

One of important matter for the lithium ion secondary batteries for HEV is cost down. In commercialized lithium ion secondary batteries for a power source of portable electronic appliances such as cellular phones, camcorders, note type personal computers, and the like, Co-containing compounded oxides have been used mainly as a positive electrode active material, however from a viewpoint of the cost, positive electrode materials containing no costly metal element such as Co are preferable for lithium ion secondary batteries for large scale HEV. Further, in use for HEV, in order to efficiently recover the battery capacity, it is more desirable as the charging side output is higher in terms of system planning. However, in the case of using the conventionally used active materials such as lithium cobalt oxide $LiCoO_2$, lithium nickel oxide $LiNiO_2$, and lithium manganese oxide $LiMn_2O_4$, since the positive electrode potential is high, there is a problem that battery voltage becomes high and the output in the charging side is lowered. Therefore, to be used for HEV, batteries having low charge-discharge voltage are required.

As a positive electrode active material for a lithium ion secondary battery for HEV satisfying the above-mentioned requirements, active materials containing only elements which are relatively economically supplied such as lithium-containing olivine type phosphates, Ni—Mn type compounded oxides have been widely investigated in these years. Among them, Li(LiNiMn) compounded oxides having a crystal structure belonging to space group R-3 m and containing Li in transition metal site have drawn attraction as an economical and high capacity positive electrode material since it causes dissociation of $Li_2O$ at 4.5 V or more (vs. Li/Li$^+$) and gives capacity attributed to redox reaction of $Mn^{3+}/Mn^{4+}$ (US Patent Laid-Open No. 2003/0108793A1)

However, since batteries using these positive electrode active materials have high electric resistance as compared with batteries using Co type compounded oxides, in the case of charging and discharging at high electric current, the resistance over voltage is increased and the battery voltage is decreased to result in a problem that no sufficient output property can be obtained.

SUMMARY OF THE INVENTION

With respect to a non-aqueous electrolyte secondary battery using, as a positive electrode active material, a lithium-containing transition metal oxide containing nickel and manganese as transition metals, an object of the present invention is to provide a non-aqueous electrolyte secondary battery having a low electric resistance and excellent in output properties.

The present invention provides a non-aqueous electrolyte secondary battery comprising a positive electrode containing a positive electrode active material, a negative electrode containing a negative electrode active material, and a non-aqueous electrolyte having lithium ion conductivity and characterized in that a mixture of a lithium-containing transition metal oxide $Li_aNi_xMn_yO_2$, wherein a, x, and y respectively satisfy the following relations: $1<a\leq1.5$; $0.5\leq x+y\leq1$; $0<x<1$; and $0<y<1$, containing nickel and manganese as transition metals and having the layered rock-salt type crystal structure of a hexagonal system belonging to space group R-3 m and a lithium manganese oxide $Li_{(1+b)}Mn_{(2-b)}O_4$, wherein b satisfies $0\leq b\leq0.33$, having a spinel structure is used as the positive electrode active material.

According to the present invention, use of the mixture of a lithium-containing transition metal oxide and a lithium manganese oxide as a positive electrode active material makes it possible to obtain electric resistance lower than that attributed to the respective active substances of the lithium-containing transition metal oxide and the lithium manganese oxide and thus obtain a non-aqueous electrolyte secondary battery excellent in output properties. Further, the battery is provided with voltage lower than that provided in the case of using the lithium manganese oxide alone.

The lithium-containing transition metal oxide defined by the formula $Li_aNi_xMn_yO_2$ in the present invention is characterized in that Li is contained in 3b site where transition metals exist and Li in 3b site is dissociated at 4.5 V or more vs. Li/Li$^+$ negative electrode potential. Through the reaction, redox reaction of $Mn^{3+/4+}$ is caused, resulting in capacity increase and potential decrease in the charge-discharge curve. Accordingly, since the quantity of Li in 3b site is considerably significantly relevant to the battery capacity, it is preferable that a in the above-mentioned formula is in a range of $1<a\leq1.5$. Further, from a viewpoint of balancing increasing the battery capacity and decreasing the charge-discharge voltage of the battery, it is more preferably in a range of $1.1<a\leq1.3$. The amount of Li in 3b site can be determined by x-ray diffraction method or neutron diffraction method.

The amount of Ni, x, in the present invention is considerably significantly relevant to the battery capacity at 4.5 V or less vs. Li/Li$^+$ and on the other hand, the amount of Mn, y, is required to be high to lower the cost and lower the charge-discharge voltage of the battery and therefore in terms of the balance between them, it is preferable that the molar ratio of Ni/Mn (x/y) is lower than 1. Further, since the battery is characterized in that Li exists in 3b site as described above, it is required to satisfy $x+y<1$. In particular, since dissociation of Li at 4.5 V or more vs. Li/Li$^+$ is facilitated to activate a redox reaction of $Mn^{3+/4+}$, it is preferable to be at $0.5<x+y<0.9$, and more preferable to be at $0.65<x+y<0.85$. If the amount of Mn in the lithium-containing transition metal oxide is increased as described, the charge-discharge potential of the positive electrode can be low and accordingly, it is made possible to carry out material planning suitable for improving the output in the charge side.

The mixing ratio (lithium-containing transition metal oxide:lithium manganese oxide) by weight of the lithium-containing transition metal oxide and the lithium manganese oxide in the present invention is preferably (1:9) to (9:1). From a viewpoint of cost down, it is more preferably in a range from (1:9) to (6:4) and even preferably in a range from (2:8) to (5:5). In virtue of control of the ratio in the above-mentioned range, it is made possible to obtain electric resistance lower than that obtained in the case of using the lithium-containing transition metal oxide and the lithium manganese oxide respectively alone and further improve the output properties.

The voltage is further lowered than that of a battery using the lithium manganese oxide alone.

With respect to the lithium-containing transition metal oxide and the lithium manganese oxide to be used in the present invention, it is important that Li is contained in 3b site, and therefore, the effect of the present invention can be caused even if one or more kinds of metal elements other than Li, Ni, and Mn are contained. Specifically, the following metals may be contained additionally: B, Mg, Al, Si, P, Ca, Sc, Ti, Cr, Fe, Co, Cu, Zn, Ga, Ge, As, Sr, Y, Zr, Nb, Mo, Tc, Ru, Rh, Pd, In, Sn, Sb, Te, Ba, lanthanides, Hf, Ta, W, Re, Os, Ir, Pt, Pb, Bi, Ra, and actinides. In terms of assurance of energy density per weight (Wh/kg) of the active material, the content of the metal elements contained in 3b site relative to transition metals is preferably 0.1 by mole or lower and more preferably 0.001 or higher and 0.05 or lower. Because of the same reason, the same effect can be caused even if one or more of halogen elements or chalcogen elements are contained. Specifically, the following halogens or chalcogen elements may be contained additionally: F, Cl, Br, I, At, S, Se, Te, and Po. In terms of assurance of energy density per weight (Wh/kg) of the active material, the content of the halogen elements and chalcogen elements relative to oxygen atom contained in 6C site is preferably 0.1 by mole or lower and more preferably 0.001 or higher and 0.05 or lower.

The supporting salt to be used in the present invention may be lithium salt commonly used as an electrolyte of non-aqueous electrolyte secondary batteries. Such lithium salts preferably contain one or more elements among P, B, F, O, S, N, and Cl. Practical examples to be used as the lithium salts are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and mixtures of them. Further, in addition to these salts, lithium salts containing oxalate complexes as anion are preferably added and lithium-bis (oxalate) borate capable of suppressing resistance increase after high temperature storage is more preferably added.

As a solvent of the non-aqueous electrolyte solution to be used in the present invention, those which have been conventionally used as a solvent of the non-aqueous electrolyte secondary batteries may be. For example, cyclic carbonates such as ethylene carbonate, propylene carbonate, butylene carbonate, and vinylene carbonate; and linear carbonates such as dimethyl carbonate, methyl ethyl carbonate, and diethyl carbonate may be used. In particular, a mixed solvent of a cyclic carbonate and a linear carbonate with low viscosity, low melting point, and high lithium ion conductivity is preferable. Further, ionic liquid may be used as the solvent for electrolytes. The cation type and anion type are not particularly limited and from a viewpoint of attainment of low viscosity, electrochemical stability, and hydrophobicity, combinations of, as cation, pyridinium cation, imidazolium cation, and quaternary ammonium cation and, as an anion, a fluorine-containing imide type anion are particularly preferable.

Materials to be used for the negative electrode active material in the present invention are not particularly limited as long as they are capable of reversible absorption and desorption, and carbon, alloy, metal oxide, and the like can be used. Particularly from a viewpoint of the cost, carbon materials are preferably used and practical examples of the carbon materials are natural graphite, artificial graphite, meso-phase pitch type carbon fiber (MCF), meso-carbon microbeads (MCMB), coke, hard carbon, fullerene, carbon nanotube, and the like. It is more preferable to use graphite type carbon materials which are capable of retaining the potential of $Li[LiNiMn]O_2$ compounded oxide positive electrode in a battery at 4.5 V or more vs. $Li/Li^+$ at initial charging and easy to cause structure change are preferable since they show slight potential alteration along with intercalation and deintercalation of lithium.

According to the present invention, using, as a positive electrode active material, a mixture of the lithium-containing transition metal oxide containing nickel and manganese as transition metals and having crystal structure belonging to space group R-3 m and the lithium manganese oxide having spinel structure makes it possible to obtain electric resistance lower than that obtained in the case of using each of the lithium-containing transition metal oxide and the lithium manganese oxide alone and improve the output property. Further, a battery with lower voltage than that of a battery using the lithium manganese oxide alone can be obtained.

DETAILED DESCRIPTION OF THE PREFERRED EMBODIMENTS

Figure 1:
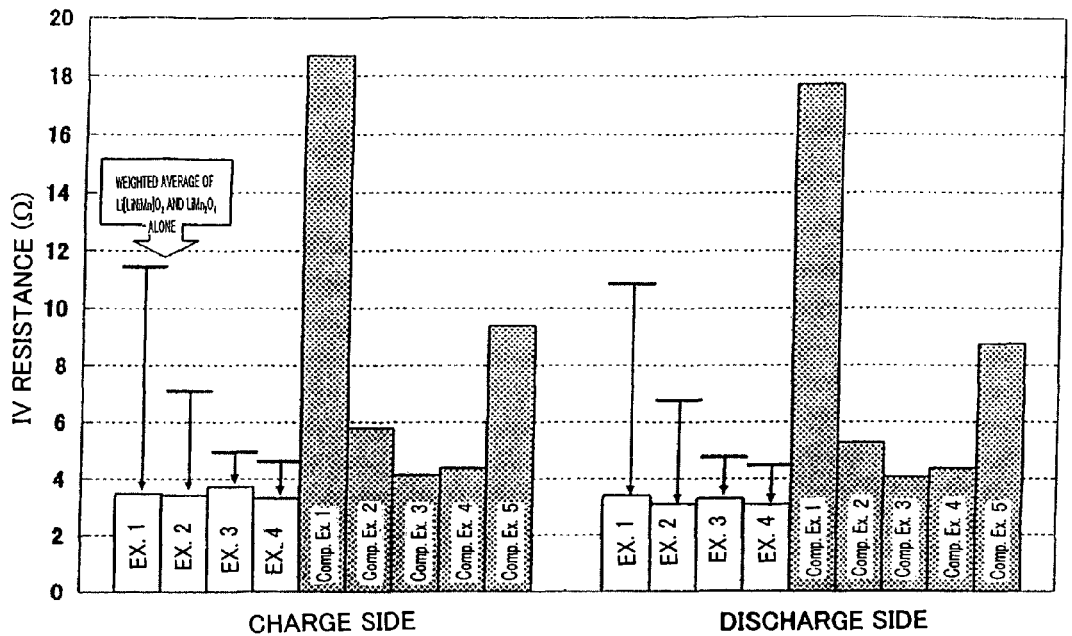
FIG. 1 shows a view showing IV resistance of Examples and Comparative Examples.

Hereinafter, the present invention will be described more in detail according to Examples, however it is not intended that the present invention be limited to the following Examples. Modifications and implementations can be appropriately made without departing from the spirit.

Examples 1 to 4 and Comparative Example 1 to 5

Production of Positive Electrode Active Material

A lithium-containing transition metal oxide was produced by mixing $Li_2CO_3$ and a Ni—Mn compounded hydroxide, which is obtained as a firing precursor by adding an alkaline solution to a solution mixture of a Ni salt and a Mn salt and then coprecipitating hydroxides of Ni and Mn, so that the molar ratio of Li:Ni:Mn is 1.3:0.1:0.6; and pre-firing the mixture at 500° C. for 10 hours in air; and successively firing the pre-fired mixture at 1000° C. for 20 hours. The composition of the obtained lithium-containing transition metal oxide was $Li(Li_{0.3}Ni_{0.1}Mn_{0.6})O_2$.

Further, $Li(Li_{0.22}Ni_{0.17}Mn_{0.61})O_2$ was produced in the same manner as the production of the above-mentioned lithium-containing transition metal oxide, except that the firing raw materials were mixed so that the molar ratio of Li:Ni:Mn is 1.22:0.17:0.61.

A lithium manganese oxide was produced by mixing LiOH and manganese sulfate so that the molar ratio of Li:Mn is 1:2; and firing the mixture at 800° C. for 24 hours in atmospheric air. The composition of the obtained lithium manganese oxide was $LiMn_2O_4$.

A lithium-containing transition metal oxide $Li(Ni_{0.5}Mn_{0.5})O_2$ used in Comparative Examples 3 and 4 was obtained by producing compounded hydroxide of Ni and Mn by adjusting hydroxides of Ni and Mn at 1:1 by mole; mixing the compounded hydroxide with $Li_2CO_3$ so that the molar ratio of Li:Ni:Mn is 1.0:0.5:0.5; and firing the mixture in the same manner as that in the case of producing the above-mentioned lithium-containing transition metal oxides.

[Production of Positive Electrode]

$Li(L_{0.3}Ni_{0.1}Mn_{0.6})O_2$, $Li(Li_{0.22}Ni_{0.17}Mn_{0.61})O_2$, $LiMn_2O_4$, and $Li(Ni_{0.5}Mn_{0.5})O_2$ produced as described above were mixed at the mixing ratios shown in Table 1 to obtain positive electrode active materials.

Each of the positive electrode active material, carbon as a conductive agent, and an N-methyl-2-pyrrolidone solution dissolving poly(vinylidene fluoride) as a binder were mixed and kneaded to obtain each positive electrode slurry so that the weight ratio of active material:conductive agent:binder is 90:5:5. The produced slurry was applied on an aluminum foil as a current collector and dried and successively rolled by rolling rollers and a current collector tub was attached to the resulting aluminum foil to produce a positive electrode.

[Production of Electrolytic Solution]

An electrolytic solution was produced by dissolving 1 mol/L of $LiPF_6$ in a solvent mixture obtained by mixing ethylene carbonate (EC), methyl ethyl carbonate (MEC), and dimethyl carbonate (DMC) at 3:3:4 by volume; and further dissolving 1% by weight of vinylidene carbonate (VC) as a film formable agent.

[Production of Tripolar Beaker Cell]

Figure 4:
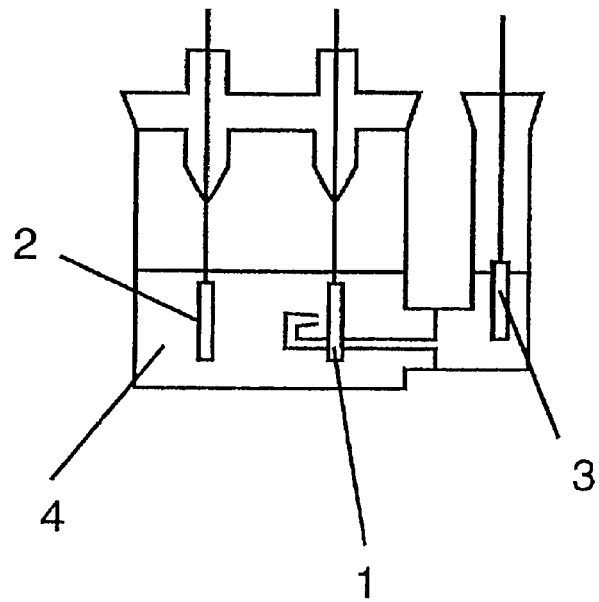
FIG. 4 shows a cross-section view showing a tripolar beaker cell.

A tripolar beaker cell shown in FIG. 4 was produced using the positive electrode and electrolytic solution produced in the above-mentioned manner in a globe box under argon atmosphere. As shown in FIG. 4, the beaker was filled with the electrolytic solution 4 and the work pole 1, a counter pole 2, and a reference pole 3 were inserted in the electrolytic solution 4. Using the work pole 1 as the positive electrode and lithium metal was used for the counter pole 2 and the reference pole 3 to produce cells A to I.

[Charge-Discharge Test]

Above-mentioned each cell was subjected to a charge-discharge test. After a cycle of charging at 1 mA to 4.6 V (vs. $Li/Li^+$), pausing for 10 minutes, and discharging at 1 mA to 2.0 V (vs. $Li/Li^+$) was repeated once at a room temperature, a cycle of charging at 1 mA to 4.3 V (vs. $Li/Li^+$) and discharging at 1 mA to 2.0 V (vs. $Li/Li^+$) was repeated 5 times. After that, charging to 50% of charging depth (SOC) calculated from the discharge capacity of the final cycle was carried out.

[Open Circuit Voltage Measurement Test]

After each battery whose SOC was adjusted at 50% by the above-mentioned charge-discharge test was kept still for 30 minutes after charging, the voltage was measured to calculate open circuit voltage (OCV). After that, charging to 70% of SOC calculated from the discharge capacity in the above-mentioned charge-discharge test. The OCV at the time of 50% SOC is shown in Table 1.

[IV Resistance Measurement Test]

The charge side IV resistance was calculated according to the following test.

(1) 1 mA charging (10 seconds)→pause (5 minutes)→1 mA discharge (10 seconds)→pause (5 minutes)

(2) 5 mA charging (10 seconds)→pause (5 minutes)→1 mA discharge (50 seconds)→pause (5 minutes)

(3) 10 mA charging (10 seconds)→pause (5 minutes)→1 mA discharge (100 seconds)→pause (5 minutes)

(4) 20 mA charging (10 seconds)→pause (5 minutes)→1 mA discharge (200 seconds)→pause (5 minutes)

The charge-discharge tests (1) to (4) were successively carried out at a room temperature and the potential after 10 seconds from each charging step was measured and IV resistance was calculated from the inclination of the alteration of the current values and OCV was calculated from the intercept.

The output value in the charging side was calculated according to the following equality from IV resistance and OCV.

Charging side output value (W)=(4300−OCV)/IV resistance×4300

The discharge side IV resistance was calculated according to the following test.

(1) 1 mA discharging (10 seconds)→pause (5 minutes)→1 mA charge (10 seconds)→pause (5 minutes)

(2) 5 mA discharging (10 seconds)→pause (5 minutes)→1 mA charge (50 seconds)→pause (5 minutes)

(3) 10 mA discharging (10 seconds)→pause (5 minutes)→1 mA charge (100 seconds)→pause (5 minutes)

(4) 20 mA discharging (10 seconds)→pause (5 minutes)→1 mA charge (200 seconds)→pause (5 minutes)

The charge-discharge tests (1) to (4) were successively carried out at a room temperature and the potential after 10 seconds from each discharging step was measured and IV resistance was calculated from the inclination of the alteration of the current values and OCV was calculated from the intercept.

The output value in the discharging side was calculated according to the following equality from IV resistance and OCV.

Discharging side output value (W)=(OCV−2000)/IV resistance×2000

The charge IV resistance, discharge IV resistance, charge side output, and discharge side input measured in the above-mentioned manner are shown in Table 1.

TABLE 1

| | Cell | Positive Electrode Active Material | Mixing Ratio Li [LiNiMn] $O_2$ (% by weight) | Mixing Ratio of $LiMn_2O_4$ (% by weight) | Charge IV Resistance (Ω) | Discharge IV Resistance (Ω) | Charge Side Output (W) | Discharge Side Output (W) | OCV at SOC 50% (V) |
|---|---|---|---|---|---|---|---|---|---|
| Ex. 1 | A | Li [$Li_{0.3}Ni_{0.1}Mn_{0.6}$] $O_2$/ $LiMn_2O_4$ | 50 Li [$Li_{0.3}Ni_{0.1}Mn_{0.6}$] $O_2$ | 50 | 3.475 | 3.401 | 0.336 | 1.191 | 3.64 |
| Ex. 2 | B | Li [$Li_{0.3}Ni_{0.1}Mn_{0.6}$] $O_2$/ $LiMn_2O_4$ | 20 Li [$Li_{0.3}Ni_{0.1}Mn_{0.6}$] $O_2$ | 80 | 3.421 | 3.099 | 0.357 | 1.305 | 3.819 |
| Ex. 3 | C | Li [$Li_{0.22}Ni_{0.17}Mn_{0.61}$] $O_2$/ $LiMn_2O_4$ | 50 Li [$Li_{0.22}Ni_{0.17}Mn_{0.61}$] $O_2$ | 50 | 3.723 | 3.301 | 0.370 | 1.202 | 3.712 |
| Ex. 4 | D | Li [$Li_{0.22}Ni_{0.17}Mn_{0.61}$] $O_2$/ $LiMn_2O_4$ | 20 Li [$Li_{0.22}Ni_{0.17}Mn_{0.61}$] $O_2$ | 80 | 3.312 | 3.106 | 0.391 | 1.317 | 3.593 |

TABLE 1-continued

| | Cell | Positive Electrode Active Material | Mixing Ratio Li [LiNiMn] $O_2$ (% by weight) | Mixing Ratio of $LiMn_2O_4$ (% by weight) | Charge IV Resistance ($\Omega$) | Discharge IV Resistance ($\Omega$) | Charge Side Output (W) | Discharge Side Output (W) | OCV at SOC 50% (V) |
|---|---|---|---|---|---|---|---|---|---|
| Comp. Ex. 1 | E | Li $[Li_{0.3}Ni_{0.1}Mn_{0.6}] O_2$ | Li $[Li_{0.3}Ni_{0.1}Mn_{0.6}] O_2$ 100 | 0 | 18.703 | 17.701 | 0.112 | 0.197 | 3.385 |
| Comp. Ex. 2 | F | Li $[Li_{0.22}Ni_{0.1}Mn_{0.61}] O_2$ | Li $[Li_{0.22}Ni_{0.17}Mn_{0.61}] O_2$ 100 | 0 | 5.778 | 5.278 | 0.351 | 0.695 | 3.594 |
| Comp. Ex. 3 | G | $LiMn_2O_4$ | 0 | 100 | 4.134 | 4.060 | 0.292 | 0.993 | 3.952 |
| Comp. Ex. 4 | H | Li $[Ni_{0.5}Mn_{0.5}] O_2/$ $LiMn_2O_4$ | Li $[Ni_{0.5}Mn_{0.5}] O_2$ 50 | 50 | 4.380 | 4.365 | 0.244 | 0.939 | 3.964 |
| Comp. Ex. 5 | I | Li $[Ni_{0.5}Mn_{0.5}] O_2$ | Li $[Ni_{0.5}Mn_{0.5}] O_2$ 100 | 0 | 9.391 | 8.751 | 0.138 | 0.455 | 3.877 |

Figure 2:
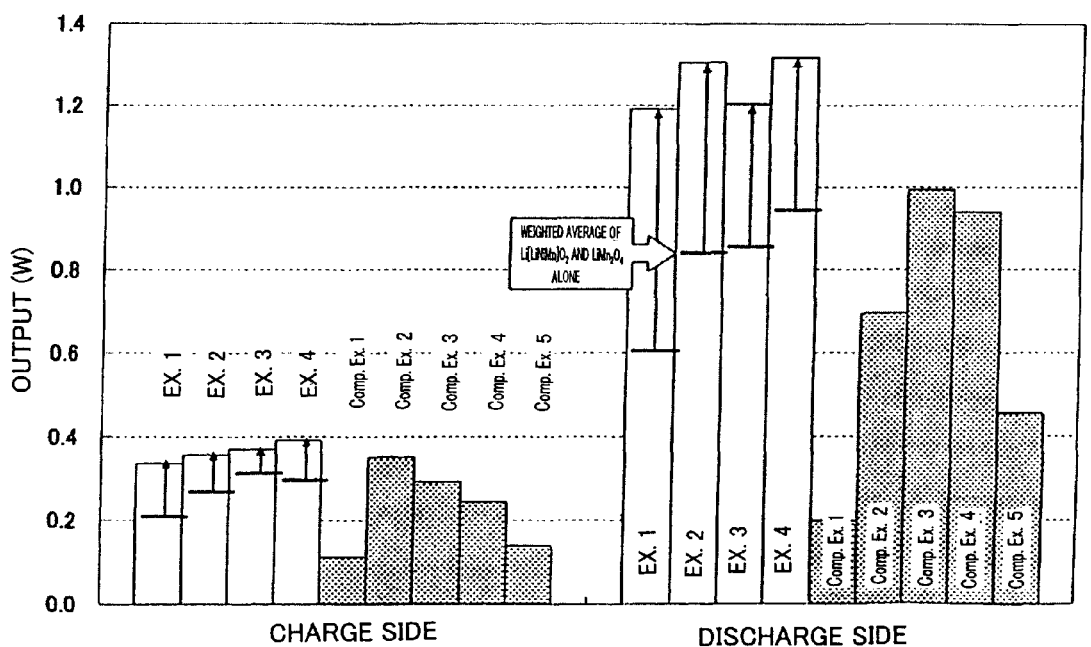
FIG. 2 shows a view showing charge output and discharge output of Examples and Comparative Examples.
Figure 3:
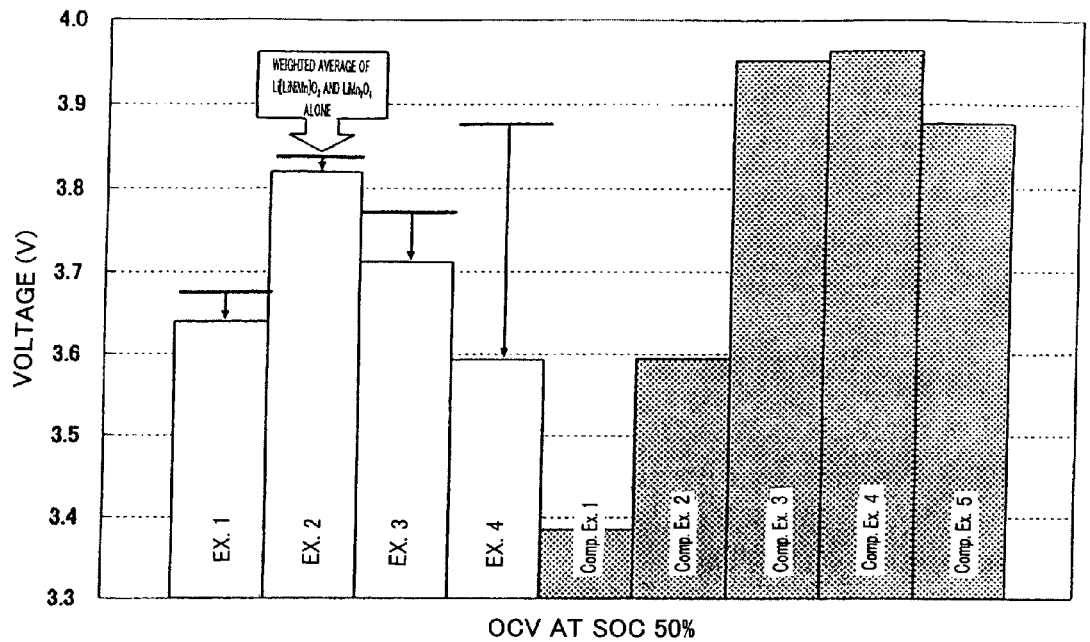
FIG. 3 shows a view showing open circuit voltage (OCV) at SOC 50% of Examples and Comparative Examples.

FIG. 1 shows the charge IV resistance and discharge IV resistance of Examples 1 to 4 and Comparative Examples 1 to 5. FIG. 2 shows the charge side output, and discharge side input of Examples 1 to 4 and Comparative Examples 1 to 5. FIG. 3 shows open circuit voltage (OCV) at 50% SOC of Examples 1 to 4 and Comparative Examples 1 to 5. FIG. 1 to FIG. 3 show weighted average lines for the respective mixing ratios of Examples 1 to 4 calculated from the numeral values in the case of using each of the substances of Comparative Examples 1 to 3 alone.

As it is made clear from Table 1 and FIG. 1 to FIG. 3, the charge IV resistance and discharge IV resistance were lower and the charge side output and discharge side input were higher in Examples 1 to 4 using the mixtures of the lithium-containing transition metal oxide and the lithium manganese oxide as the positive electrode active material according to the present invention than the weighted average values of Comparative Examples 1 and 2 using the lithium-containing transition metal oxide alone and Comparative Example 3 using the lithium manganese oxide alone. Accordingly, it is supposed that the effect of the present invention is to particularly lower the electric resistance by mixing the lithium-containing transition metal oxide and the lithium manganese oxide and it is not the output property improvement calculated in simple weighted average calculation. The detailed mechanism for the effect is not sufficiently clear, however it is assumed as follows. When charged to a potential of 4.5 V vs. Li/Li$^+$ or higher, the lithium-containing transition metal oxide gains redox capacity of Mn$^{3+/4+}$ thereafter. Such reaction is characteristic of the lithium-containing transition metal oxide containing Li in 3b side and in the case of a lithium-containing transition metal oxide with a=1 containing no Li in 3b side, Mn is always irrelevant to charging and discharging in tetravalent state and therefore such reaction does not appear. Further, the redox reaction of the lithium manganese oxide is also redox reaction of Mn$^{3+/4+}$. Therefore, it is assumed as follows: although the intercalation site of Li differs as to be 3a site of the layered lock-salt structure and 8a site of the spinel structure, respectively, in the lithium-containing transition metal oxide having the layered rock-salt structure and containing Li in 3b site and the lithium manganese oxide having the spinel structure, the redox reaction of Mn$^{3+/4+}$ is same and accordingly the energy bands of both compounds become close and the particles of the compounds are brought into contact with each other and have the same potential, so that the electrochemical interaction can be caused and energy needed for the Li insertion and desertion can be lowered and as a result, the effect to lower the electric resistance can be caused.

Further, in the case of Comparative Example 5 using the lithium-containing transition metal oxide in which the composition ratio a of Li is 1 and Comparative Example 4 using the lithium-containing transition metal oxide mixed with lithium manganese oxide, unlike the case of Examples 1 to 4 according to the present invention, neither remarkable decrease of the charge IV resistance and discharge IV resistance nor remarkable increase of the charge side output and discharge side input was confirmed. Accordingly, it is understood that the specific effect of the present invention is expressed in only the lithium-containing transition metal oxide containing excess Li.

What is claimed is:

1. A non-aqueous electrolyte secondary battery comprising a positive electrode containing a positive electrode active material, a negative electrode containing a negative electrode active material, and a non-aqueous electrolyte having lithium ion conductivity, wherein a mixture of a lithium-containing transition metal oxide $Li_aNi_xMn_yO_2$, wherein a, x, and y respectively satisfy the following relations: $1<a\leq1.5$; $0.5\leq x+y\leq1$; $0<x<1$; and $0<y<1$, containing nickel and manganese as transition metals in a molar ratio (x/y) of Ni/Mn in the lithium-containing transition metal oxide of less than 1 while satisfying x+y<1 and having a layered rock-salt type crystal structure of a hexagonal system belonging to space group R-3m, and a lithium manganese oxide $Li_{(1+b)}Mn_{(2-b)}O_4$, wherein b satisfies $0\leq b\leq0.33$, having a spinel structure, is used as the positive electrode active material.

2. The non-aqueous electrolyte secondary battery according to claim 1, wherein the lithium-containing transition metal oxide and the lithium manganese oxide are mixed at a ratio (lithium-containing transition metal oxide:lithium manganese oxide) by weight in a range from (1:9) to (9:1).

3. The non-aqueous electrolyte secondary battery according to claim 1, wherein Li is contained in the 3b transition metal site of the lithium-containing transition metal oxide having the layered rock-salt type crystal structure of a hexagonal system belonging to space group R-3m.

* * * * *